United States Patent
Dosovitsky

(10) Patent No.: US 9,787,581 B2
(45) Date of Patent: Oct. 10, 2017

(54) SECURE DATA FLOW OPEN INFORMATION ANALYTICS

(71) Applicant: A10 Networks, Inc., San Jose, CA (US)

(72) Inventor: Gennady Dosovitsky, Sunnyvale, CA (US)

(73) Assignee: A10 NETWORKS, INC., San Jose, CA (US)

( * ) Notice: Subject to any disclaimer, the term of this patent is extended or adjusted under 35 U.S.C. 154(b) by 30 days.

(21) Appl. No.: 14/860,601

(22) Filed: Sep. 21, 2015

(65) Prior Publication Data

US 2017/0085440 A1   Mar. 23, 2017

(51) Int. Cl.
*H04L 12/26* (2006.01)
*H04L 12/721* (2013.01)
*H04L 12/741* (2013.01)
*H04L 29/06* (2006.01)

(52) U.S. Cl.
CPC ............ *H04L 45/38* (2013.01); *H04L 43/026* (2013.01); *H04L 45/74* (2013.01); *H04L 63/0245* (2013.01); *H04L 63/1425* (2013.01); *H04L 63/0236* (2013.01); *H04L 63/0428* (2013.01)

(58) Field of Classification Search
CPC ....... H04L 43/028; H04L 45/38; H04L 45/74; H04L 63/1458; H04L 63/164; H04L 63/0428; H04L 63/0485; H04L 63/0236
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,584,023 A | 12/1996 | Hsu |

(Continued)

FOREIGN PATENT DOCUMENTS

| | | |
|---|---|---|
| CN | 1422468 A | 6/2003 |
| CN | 104106241 A | 10/2014 |

(Continued)

OTHER PUBLICATIONS

Guo, Yuan-ni et al., "An Embedded Firewall System Design Based on Ptolemy II," Journal of System Simulation, vol. 16 No. 6, pp. 1361-1363, Jun. 2004.

(Continued)

*Primary Examiner* — Jamal Javaid

(57) ABSTRACT

Provided are methods and systems for processing a secure data flow. An example method for processing a secure data flow includes receiving a data packet, determining network conditions associated with the data traffic, and determining that the data packet is associated with the secure data flow. Upon determination that the data packet is associated with the secure data flow, the data packet is analyzed. Thereafter, the method proceeds to classify the secure data flow based on the analysis. Subscriber data associated with the data packet may be obtained. The method can then process the secure data flow based on the subscriber data and the classification of the secure data flow.

20 Claims, 6 Drawing Sheets

(56) References Cited

U.S. PATENT DOCUMENTS

| | | |
|---|---|---|
| 5,684,875 A | 11/1997 | Ellenberger |
| 5,757,908 A | 5/1998 | Cooper et al. |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,185,681 B1 | 2/2001 | Zizzi |
| 6,205,115 B1 | 3/2001 | Ikebe et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,304,975 B1 | 10/2001 | Shipley |
| 6,324,286 B1 | 11/2001 | Lai et al. |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,092,357 B1 | 8/2006 | Ye |
| 7,159,237 B2 | 1/2007 | Schneier et al. |
| 7,194,766 B2 | 3/2007 | Noehring et al. |
| 7,200,760 B2 | 4/2007 | Riebe et al. |
| 7,221,757 B2 | 5/2007 | Alao |
| 7,222,366 B2 | 5/2007 | Bruton, III et al. |
| 7,296,283 B2 * | 11/2007 | Hrastar .................. H04L 29/06 |
| | | 725/109 |
| 7,392,241 B2 | 6/2008 | Lin et al. |
| 7,409,712 B1 | 8/2008 | Brooks et al. |
| 7,418,733 B2 | 8/2008 | Connary et al. |
| 7,543,052 B1 | 6/2009 | Cesa Klein |
| 7,565,549 B2 | 7/2009 | Satterlee et al. |
| 7,577,833 B2 | 8/2009 | Lai |
| 7,596,695 B2 | 9/2009 | Liao et al. |
| 7,620,733 B1 | 11/2009 | Tzakikario et al. |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,494 B1 | 6/2010 | McCorkendale et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 7,925,766 B2 | 4/2011 | Jayawardena et al. |
| 7,953,855 B2 | 5/2011 | Jayawardena et al. |
| 8,037,532 B2 | 10/2011 | Haswell |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,806,011 B1 | 8/2014 | Graham-Cumming |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,215,208 B2 | 12/2015 | Fraize et al. |
| 9,294,503 B2 | 3/2016 | Thompson et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0135625 A1 | 7/2003 | Fontes et al. |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0148520 A1 | 7/2004 | Talpade et al. |
| 2004/0172538 A1 | 9/2004 | Satoh et al. |
| 2004/0242200 A1 | 12/2004 | Maeoka et al. |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0044352 A1 | 2/2005 | Pazi et al. |
| 2005/0108434 A1 | 5/2005 | Witchey |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0210243 A1 * | 9/2005 | Archard .............. H04L 63/0428 |
| | | 713/160 |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0185014 A1 | 8/2006 | Spatscheck et al. |
| 2006/0206936 A1 | 9/2006 | Liang et al. |
| 2006/0212522 A1 | 9/2006 | Walter et al. |
| 2006/0230444 A1 | 10/2006 | Iloglu et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 | 3/2007 | Quinlan |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0291773 A1 | 12/2007 | Khan et al. |
| 2008/0183885 A1 | 7/2008 | Durrey et al. |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0077663 A1 | 3/2009 | Sun et al. |
| 2009/0083537 A1 | 3/2009 | Larsen et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 * | 11/2009 | Shouno .................. G06F 21/80 |
| | | 713/193 |
| 2010/0106833 A1 | 4/2010 | Banerjee et al. |
| 2010/0138921 A1 | 6/2010 | Na et al. |
| 2010/0284300 A1 | 11/2010 | Deshpande et al. |
| 2010/0286998 A1 | 11/2010 | Picken |
| 2011/0026537 A1 | 2/2011 | Kolhi et al. |
| 2011/0029599 A1 | 2/2011 | Pulleyn et al. |

(56) References Cited

U.S. PATENT DOCUMENTS

| | | |
|---|---|---|
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0117646 A1 | 5/2012 | Yoon et al. |
| 2012/0144461 A1 | 6/2012 | Rathbun |
| 2012/0155274 A1 | 6/2012 | Wang et al. |
| 2012/0163186 A1 | 6/2012 | Wei et al. |
| 2012/0174196 A1 | 7/2012 | Bhogavilli et al. |
| 2012/0226582 A1 | 9/2012 | Hammad |
| 2012/0227109 A1 | 9/2012 | Dimuro |
| 2012/0266242 A1 | 10/2012 | Yang et al. |
| 2012/0307631 A1 | 12/2012 | Yang et al. |
| 2013/0019025 A1 | 1/2013 | Chaturvedi et al. |
| 2013/0124713 A1 | 5/2013 | Feinberg et al. |
| 2013/0128885 A1 | 5/2013 | Kardashov et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0198845 A1 | 8/2013 | Anvari |
| 2013/0212265 A1 | 8/2013 | Rubio Vidales et al. |
| 2013/0243194 A1 | 9/2013 | Hawkes et al. |
| 2013/0263256 A1 | 10/2013 | Dickinson et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0258489 A1 | 9/2014 | Muppala et al. |
| 2014/0258536 A1 | 9/2014 | Chiong |
| 2014/0269308 A1 | 9/2014 | Oshiba |
| 2014/0280832 A1 | 9/2014 | Oshiba |
| 2014/0283065 A1 | 9/2014 | Teddy et al. |
| 2014/0298091 A1 | 10/2014 | Carlen et al. |
| 2014/0310396 A1* | 10/2014 | Christodorescu ...... G06N 5/022 709/224 |
| 2014/0325588 A1 | 10/2014 | Jalan et al. |
| 2014/0344925 A1 | 11/2014 | Muthiah |
| 2015/0033341 A1 | 1/2015 | Schmidtler et al. |
| 2015/0058977 A1 | 2/2015 | Thompson et al. |
| 2015/0088597 A1 | 3/2015 | Doherty et al. |
| 2015/0143118 A1 | 5/2015 | Sheller et al. |
| 2015/0312268 A1 | 10/2015 | Ray |
| 2015/0333988 A1 | 11/2015 | Jalan et al. |
| 2016/0036651 A1 | 2/2016 | Sureshchandra et al. |

FOREIGN PATENT DOCUMENTS

| | | |
|---|---|---|
| HK | 1198848 A | 6/2015 |
| TW | 375721 | 12/1999 |
| TW | 477140 | 2/2002 |
| TW | 574655 | 2/2004 |
| TW | NI197237 | 2/2004 |
| TW | I225999 | 1/2005 |
| TW | I241818 | 10/2005 |
| TW | I252976 | 4/2006 |
| WO | WO9842108 | 9/1998 |
| WO | WO2006039529 A2 | 4/2006 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |
| WO | WO2015030977 A1 | 3/2015 |

OTHER PUBLICATIONS

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International conference on Advanced Information Networking and Applications, vol. 2 pp. 661-666, Mar. 28-30, 2005.

Liebergeld, Steffen et al., "Cellpot: A Concept for Next Generation Cellular Network Honeypots," Internet Society, Feb. 23, 2014, pp. 1-6.

Oracle Corporation. Oracle Intelligent Agent User's Guide, Release 9.2.0, Part No. A96676-01. Mar. 2002.

SOL11243. iRules containing the RULE_INIT iRule event do not re-initialize when a syntax error is corrected. f5. support.com. May 24, 2010.

Mutz, "Linux Encryption How to," available at http://encryptionhowto.sourceforge.net/Encryption-HOWTO-1.html, Oct. 4, 2000.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Dainotti, Albert et al. "Early Classification of Network Traffic through Multi-Classification." Apr. 27, 2011. Springer Verlag, Traffic Monitoring and Analysis, Proceedings of the Third International Workshop, TMA 2011. pp. 122-135. Retrieved from INSPEC. Accession No. 12232145.

"How to Create a Rule in Outlook 2003" CreateaRule-Outlook2003.doc 031405 mad, 3 pages.

* cited by examiner

SECURE DATA FLOW OPEN INFORMATION ANALYTICS

TECHNICAL FIELD

This disclosure relates generally to data processing and, more specifically, to processing of secure data flows.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In network communications, amount of secure data flows is increasingly growing. Encryption of data traffic is typically used by content providers in attempt to protect privacy of end users. For this purpose, content providers offer a plurality of mechanisms for encryption of the content inside data packets. However, while satisfying privacy concerns of end users, the encryption of data traffic may create problems for network service providers. The network service providers may perform classification of the data traffic to understand which type of the data traffic is flowing over the network or with which application the data traffic is associated.

To classify the data traffic, network service providers often rely on analysis of the content of the data traffic. One of the techniques used by the network service providers for analysis of the data traffic is deep packet inspection. Using the deep packet inspection, the network service providers may analyze a payload of a data packet to determine the type of the data flow or an application category to which a particular data flow belongs. However, conventionally used data traffic analysis techniques may not be available for encrypted data traffic. Therefore, network service providers may have difficulties in analyzing and understanding secure data flows.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to processing of a secure data flow. Specifically, a method for processing a secure data flow may include receiving a data packet. The method may further include determining network conditions associated with the data traffic. The method can include determining that the data packet is associated with the secure data flow. Upon determination that the data packet is associated with the secure data flow, the data packet may be analyzed. The method can further include classifying the secure data flow based on the analysis. Furthermore, subscriber data associated with the data packet may be obtained. The method may further include processing the secure data flow based on the subscriber data and the classification of the secure data flow According to another approach of the present disclosure, there is provided a system for processing a secure data flow. The system may comprise a servicing node and an analyzing unit. The servicing node can be operable to receive a data packet and to determine that the data packet is associated with the secure data flow. Additionally, the servicing node can be operable to obtain subscriber data associated with the data packet. The analyzing unit can be operable to analyze the data packet and, based on the analysis, classify the secure data flow. The analyzing unit can further be operable to process the secure data flow based on the subscriber data and based on the classification of the secure data flow.

In further example embodiments of the present disclosure, the method steps are stored on a machine-readable medium comprising instructions, which when implemented by one or more processors, perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
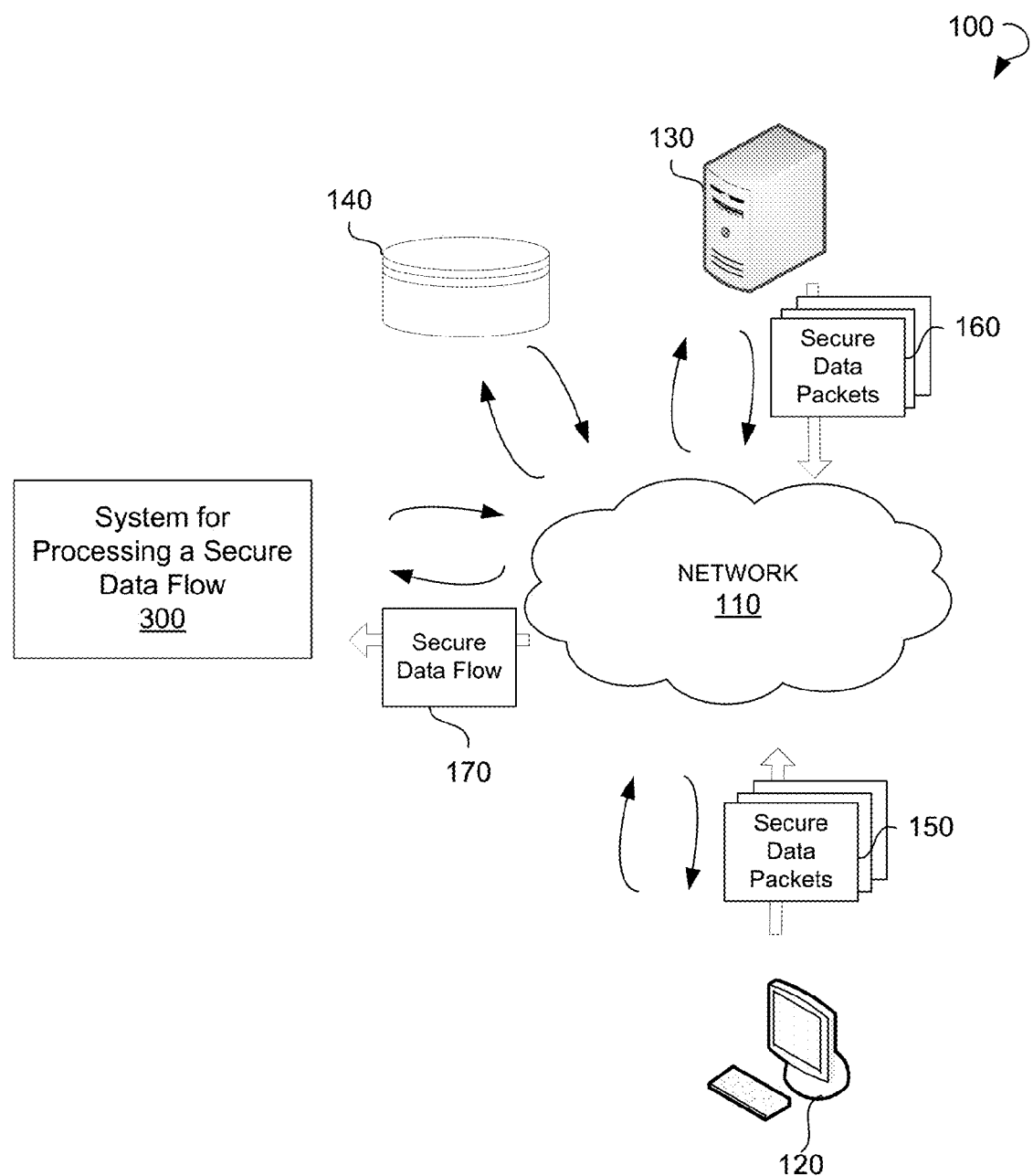
FIG. 1 shows an environment, within which methods and systems for processing a secure data flow can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), a game console, a handheld gaming device, a cellular phone, a smart phone, a smart television system, and so forth.

The present disclosure relates to methods and systems for processing a secure data flow. An example system of the present disclosure may include a servicing node positioned after a first network hop in a data traffic path between a subscriber and a server. As used herein, a network hop may include one portion of the data traffic path, such as the data traffic path between two routing devices or other data traffic processing devices in the network. Each time the data traffic is passed to the next device, such as, for example, a router, a gateway, or a bridge, a further network hop occurs. Therefore, the servicing node may be positioned, for example, after the first routing device in the data traffic path from the subscriber to the server.

Due to the positioning after the first network hop, the servicing node may be operable to see subscriber-related information unavailable to further devices positioned after further network hops in the data traffic path. Specifically, each device that receives the data traffic may process and modify data associated with the data traffic. For example, a router that receives the data traffic may implement routing functions by replacing a subscriber address with a router address. Therefore, data associated with the data traffic and sent by the router to a further network device may include only the router address but not the subscriber address. Therefore, positioning of the servicing node after the first network hop may provide access to specific subscriber-related information, which may be lost or modified further down the data traffic path.

In the case of encrypted data traffic, data associated with headers of data packets may be available, while data associated with a payload being encrypted may be unavailable to the servicing node. In this case, the servicing node may be able to analyze only open data associated with the data packets. The open data may include subscriber-related information that the servicing node can process. The open data may include a subscriber machine address, a source network address, a destination network address (DNA), data packet size, data flow direction, data packet sequence, and so forth. Additionally, the servicing node may obtain subscriber data associated with the data packets. For example, the subscriber data may be obtained from a database or third parties.

Based on the analysis of the open data and the subscriber data, the servicing node may classify the secure data flow. The classification may include attributing the secure data flow to a certain type of data traffic, such as, for example, chat, video, voice; attributing the secure data flow to a certain subscriber; and the like. Therefore, the classification may include differentiating data flows from different subscribers and data flows associated with different applications. The servicing node may process the secure data flow based on the classification. For example, the servicing node may transmit the secure data flow to a further servicing node further down the network path and provide the further servicing node with certain open data associated with the secure data flow, which may be needed for further processing of the secure data flow by the further servicing node.

Referring now to the drawings, FIG. 1 illustrates an environment 100 within which methods and systems for processing a secure data flow can be implemented. The environment 100 may include a network 110, a subscriber 120, a server 130, a system 300 for processing a secure data flow, and a database 140. The subscriber 120 may include a network machine, a network resource, or a user that establishes a secure network session with the server 130 by sending secure data packets 150. The server 130 may be associated with a plurality of services, applications, and websites accessible over the network 110. The server 130 may communicate with the subscriber 120 by sending secure data packets 160 to the subscriber 120 in response to receiving the secure data packets 150 from the subscriber 120. The subscriber 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

The system 300 may receive a secure data flow 170. The secure data flow 170 may include the secure data packets 150 associated with the subscriber 120 and/or the secure data packets 160 associated with the server 130. The system 300 may process the secure data flow 170. The processing may include analyzing data associated with the secure data flow 170 and open data related to the subscriber 120 or the server 130. The system 300 may communicate with the database 140 in which the open data may be stored.

Figure 2:
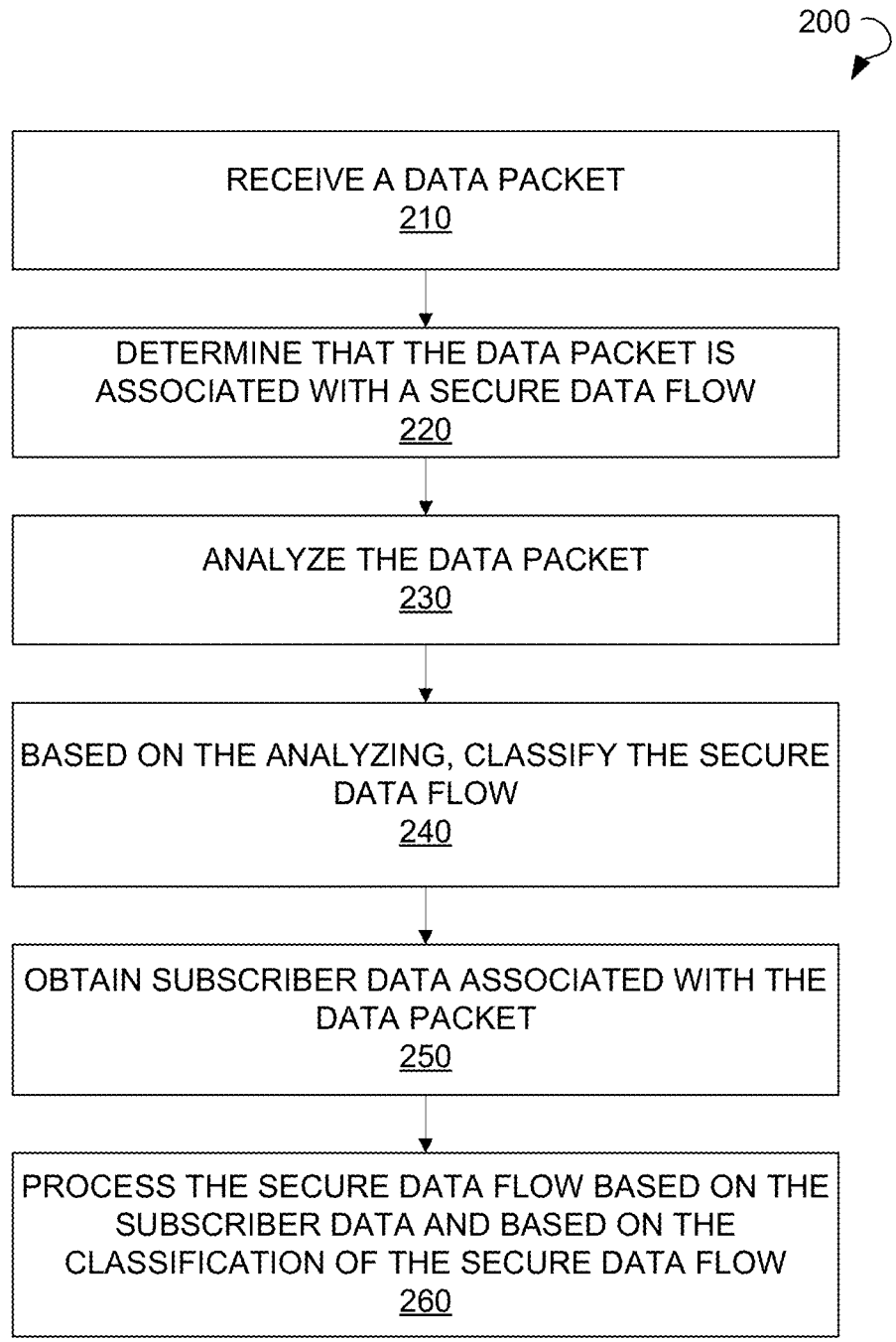
FIG. 2 shows a process flow diagram of a method for processing a secure data flow.

FIG. 2 shows a process flow diagram of a method 200 for processing a secure data flow, according to an example embodiment. In some embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence with a servicing node receiving a data packet at operation 210. In an example embodiment, the data packet may belong to an Internet Protocol (IP) User Datagram Protocol network session, IP Transmission Control Protocol (TCP) network session, and so forth. The method 200 may further include determining that the data packet is associated with the secure data flow at operation 220. In an example embodiment, the determining that the data packet is associated with the secure data flow may include determining that a payload associated with the data packet is encrypted. It should be noted that it may be impossible to conclude, for a single data packet, that the data packet contains encrypted content. However, if the data flow is initially determined to be secure, all further data packets of the secure data flow may be considered to be secure by association with the secure data flow.

Upon determining that the data packet is associated with the secure data flow, the method 200 may continue with analyzing of the data packet at operation 230. The analysis may be performed by an analyzing unit. In an example embodiment, the analyzing of the data packet may include analyzing of unsecure data associated with the data packet. Additionally, the analyzing of the data packet may be based on Domain Name System (DNS) data and Dynamic Host Configuration Protocol (DHCP) data.

The unsecure data may include open data associated with the data packet. The open data may include data available to network devices. In an example embodiment, the unsecure data may include at least one of the following: a machine address, such as a media access control (MAC) address, a source network (IP/port) address prior to network address translation (NAT) and after the NAT, a DNA, a data packet size, a flow direction, a data packet sequence, an interpacket gap, a certificate, a security key, a secure sockets layer (SSL) certificate common name, and so forth. Additionally, the open data may be based on third-party data.

In a further example embodiment, the open data may include data captured with regard to related data flows received prior to receiving of the secure data flow. The related data flows may include DNS flows, DHCP flows, authentication flows, and so forth. The open data associated with the DNS flows may include one or more of the following: a domain name address, a response IP address, a DNS host IP address, store data (a host IP address, the response IP address, the domain name). The open data associated with the DHCP flows may include allocated subscriber IP addresses. The open data associated with the authentication flows may include subscriber network session start and end indications, a host IP address, and store data (e.g., subscriber information).

At operation 240, the secure data flow may be classified based on the analysis. In an example embodiment, the classifying of the secure data flow associated with the data packet may be further based on the third-party data.

The method 200 may further include obtaining of subscriber data associated with the data packet at operation 250. In some embodiments, the subscriber data may be acquired during a subscriber discovery process or from subscriber authentication related data flows. In an example embodiment, the obtaining of the subscriber data may include obtaining host data associated with the data packet. The host data may be matched to a subscriber in a database. In further example embodiments, the host data may include at least one of the following: a session start indication, a session end indication, a host IP address, a subscriber identifier (ID), and so forth. Additionally, the open data may be associated with the subscriber data.

At operation 260, the secure data flow may be processed based on the classifying of the secure data flow and based on the subscriber data. In an example embodiment, the processing of the secure data flow may include one or more of the following: providing a security policy associated with the secure data flow to a further servicing node, providing a relay policy associated with the secure data flow to the further servicing node, relaying the unsecure data to a network controller for behavioral analysis, and so forth.

In an example embodiment, the further servicing node may include a policy enforcement engine. In fact, the unsecure data related to the data packet may be unavailable for the policy enforcement engine. However, based on the unsecure data obtained from the servicing node, the policy enforcement engine may apply specific policies to the subscriber associated with the data packet. The example specific policies may include suggesting or providing premium class services to the subscriber, applying a specific security policy to the subscriber or a group of subscribers, and so forth. Therefore, different policies may be applied to different subscribers based on analysis of the unsecure data of data flows associated with different subscribers.

The unsecure data determined by the servicing node may include unsecure data derived directly from the data packet and unsecure data determined by statistical or behavioral analysis of the data flow. In another example embodiment, the servicing node may receive the data packet associated with the secure data flow and determine that a uniform resource locator is encrypted and, therefore, unavailable. Therefore, information about a destination of the data packet may be unavailable for the servicing node. However, the servicing node may have access to an IP address of the subscriber, which can be included in the open data of the TCP protocol. The servicing node may perform a DNS request or a reverse DNS request and determine that the data packet is associated with a certain domain, e.g., a Google domain. Therefore, the servicing node may understand the destination of data packet. Additionally, as further servicing nodes may not be operable to perform the DNS request or the reverse DNS request, the servicing node may share the data associated with the destination of data packet associated with the secure data flow with the further servicing nodes.

In a further example embodiment, the servicing node may determine that a certificate associated with the data packet is issued by a certain domain, e.g., Google domain. Therefore, the servicing node may determine that a destination IP address is also associated with Google domain.

Figure 3:
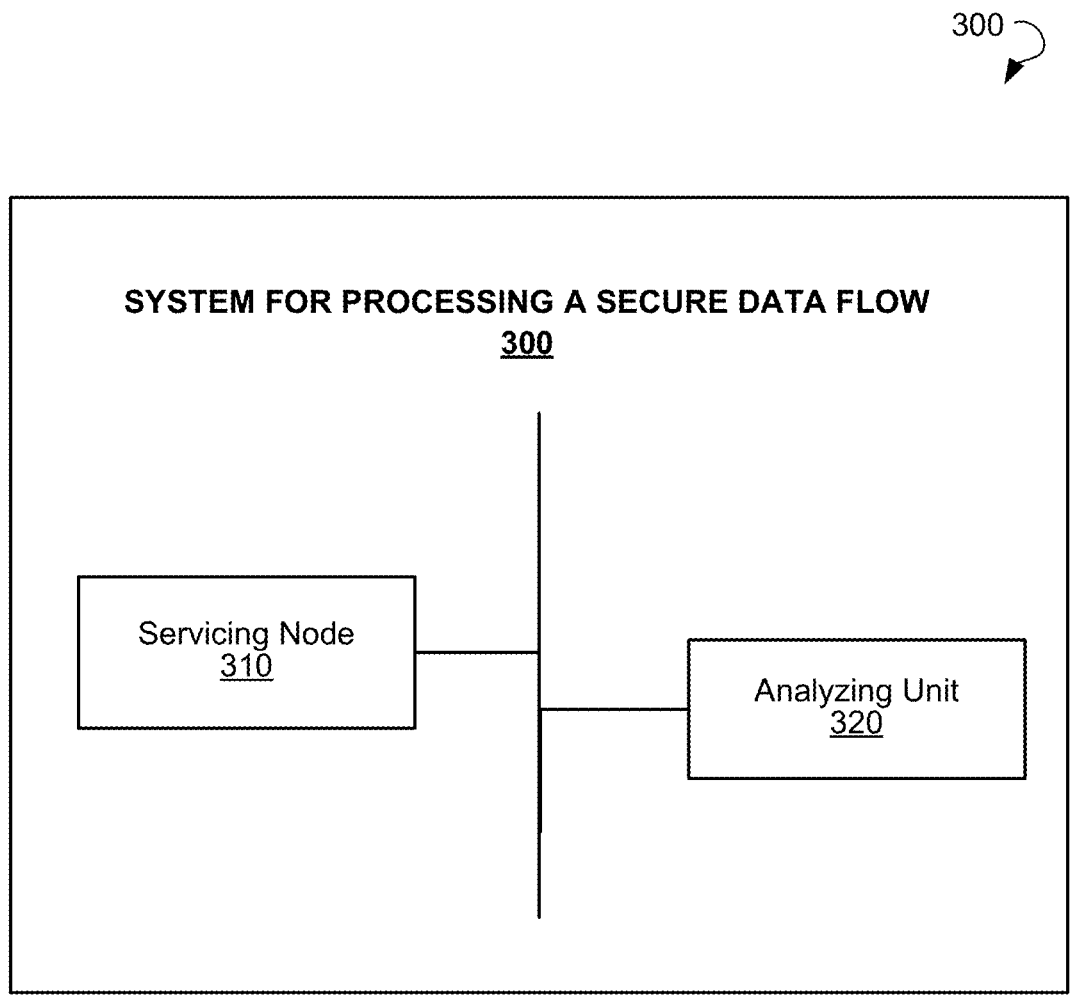
FIG. 3 shows a block diagram illustrating various modules of a system for processing a secure data flow.

FIG. 3 shows a block diagram illustrating various modules of a system 300 for processing a secure data flow, according to an example embodiment. Specifically, the system 300 may include a servicing node 310 and an analyzing unit 320. In an example embodiment, the analyzing unit 320 may be an integral part of the servicing node 310. Therefore, all functions performed by the analyzing unit 320 may be considered to be performed by the servicing node 310.

The servicing node 310 may be operable to receive a data packet. Upon receipt of the data packet, the servicing node 310 may determine that the data packet is associated with the secure data flow. In example embodiments, the determining that the data packet is associated with the secure data flow includes determining that a payload associated with the data packet is encrypted.

Additionally, the servicing node 310 may be operable to obtain subscriber data associated with the data packet. In an example embodiment, the subscriber data may be acquired during a subscriber discovery process. In a further embodiment, the subscriber data may be obtained from a subscriber controller disposed in the network. The subscriber data may include host data, such as a host IP address; a subscriber ID, such as subscriber name; International Mobile Subscriber Identity, and the like.

In an example embodiment, the obtaining of the subscriber data may include obtaining host data associated with the data packet. Upon obtaining of the host data, the servicing node 310 may perform matching of the host data to a subscriber in a database. In an example embodiment, the host data may include at least one of the following: a session start indication, a session end indication, a host IP address, a subscriber ID, and so forth.

Upon determination that the data packet is associated with the secure data flow, the servicing node 310 may provide the data packet to the analyzing unit 320. The analyzing unit 320 may be operable to analyze the data packet. In example embodiments, the analyzing of the data packet may include analyzing of unsecure data associated with the data packet. For example, the analyzing unit 320 may obtain host data, a source IP address, or a destination IP address from the data packet of an IP data flow.

Additionally, the analyzing may include associating the open data with the subscriber data. For example, the host data may be associated with subscriber data stored in the database. More specifically, the subscriber data may be determined based on an acquired source IP address and using a lookup table stored in the database. Additionally, the open data may be obtained based on a predefined collection policy and the subscriber data. Furthermore, the open data may be obtained using third party servers or databases.

In a further example embodiment, based on an acquired destination IP address, a domain name may be determined using a DNS flow lookup table in the database. In further embodiments, based on an acquired certificate key and common name, a vendor lookup table may be used to update subscriber data.

Additionally, the analyzing of the data packet may be based on DNS data and DHPD data. Based on the analysis, the analyzing unit 320 may classify the secure data flow. In some embodiments, the classifying of the secure data flow associated with the data packet may be further based on third-party data.

In an example embodiment, the servicing node may be further operable to relay the unsecure data to a network controller for behavioral analysis. The unsecure data may include at least one of the following: a MAC address, a source network (IP/port) address prior to NAT (private IP address), a source network (IP/port) address after the NAT (public IP address), a DNA, a data packet size, a flow direction, a data packet sequence, an interpacket gap, a certificate, a security key, and an SSL certificate common name.

Some characteristics may not be taken from the open data, but may be determined by the servicing node based on the open data. In example embodiments, after the private IP address is changed to the public IP address by the NAT function, the public IP address may change and data associated with the subscriber may be lost for further devices in the network. Therefore, the servicing node may determine the private IP address and relay the private IP address to the network controller for further processing or use by other devices of the network. Further characteristics determined by the servicing node may be obtained by statistical analysis or behavioral analysis of a plurality of data flows.

In a further example embodiment, a snapshot of the data flow may be created. The snapshot may represent all characteristics of the data flow. Based on the statistical analysis of the characteristics associated with the data flow, the analyzing unit may determine the type of the data traffic, such as video streaming, voice streaming, chatting, and the like. Therefore, an application associated with the secure data flow may be determined.

The servicing node 310 may be further operable to process the secure data flow based on the classifying of the secure data flow and the subscriber data at operation 260. The processing of the secure data flow may include one or more of the following: providing a security policy associated with the secure data flow to a further servicing node, providing a relay policy associated with the secure data flow to the further servicing node, providing a collection policy associated with the secure data flow to the further servicing node, and the like. More specifically, the collection policy may define open data that needs to be collected. The security policy may include an access control policy. In an example embodiment, the access control policy may include a blacklist created based on open data or subscriber data. The access control policy may further include rules for data traffic steering based on the open data (e.g., determining of a servicing node associated with a further network hop). The relay policy may prescribe open data that needs to be relayed to a further servicing node.

In some embodiments, data provided by the servicing node to the further servicing nodes, such as collected or determined open data or selected policies, may be compressed or encrypted to be understandable to the further servicing nodes.

Figure 4:
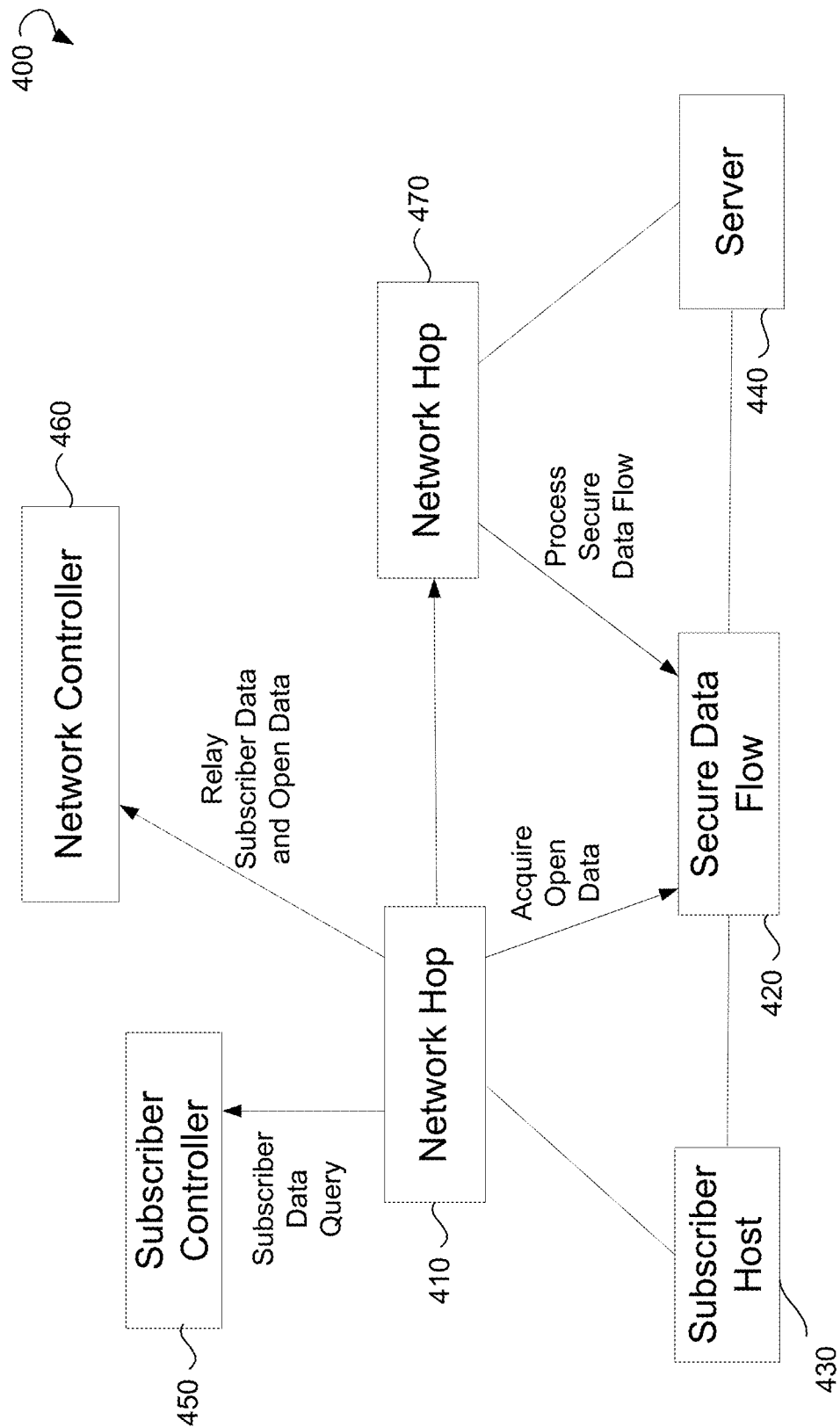
FIG. 4 is a block diagram illustrating collection of open data associated with a secure data flow.

FIG. 4 is a block diagram 400 showing collecting of open data associated with a secure data flow. A network hop 410 may be present in a network path of a secure data flow 420 between a subscriber host 430 and a server 440. In an example embodiment, a servicing node (not shown) may be positioned after the network hop 410. Upon passing of the secure data flow 420 through the network hop 410, open data related to the secure data flow 420 may be acquired. For example, host data associated with the secure data flow 420 may be obtained. Furthermore, a query to obtain subscriber data may be sent to a subscriber controller 450. The subscriber data and the open data may be relayed to a network controller 460 for further analysis. Additionally, the subscriber data and the open data may be relayed through a further network hop in the network shown as a network hop 470. The network hop 470 may receive the secure data flow 420 and process the secure data flow 420 based on the subscriber data and the open data.

Two basic relaying modes may be available for multi-hop data flow transmission: in-band mode and out-of-band mode. In in-band mode, a network service header (NSH) and TCP header may be used. In out-of-band mode, Syslog, Netflow, Internet Protocol Flow Information Export (IPFIX), and Inter-Domain Policy Routing (IDPR) protocols may be used.

Figure 5:
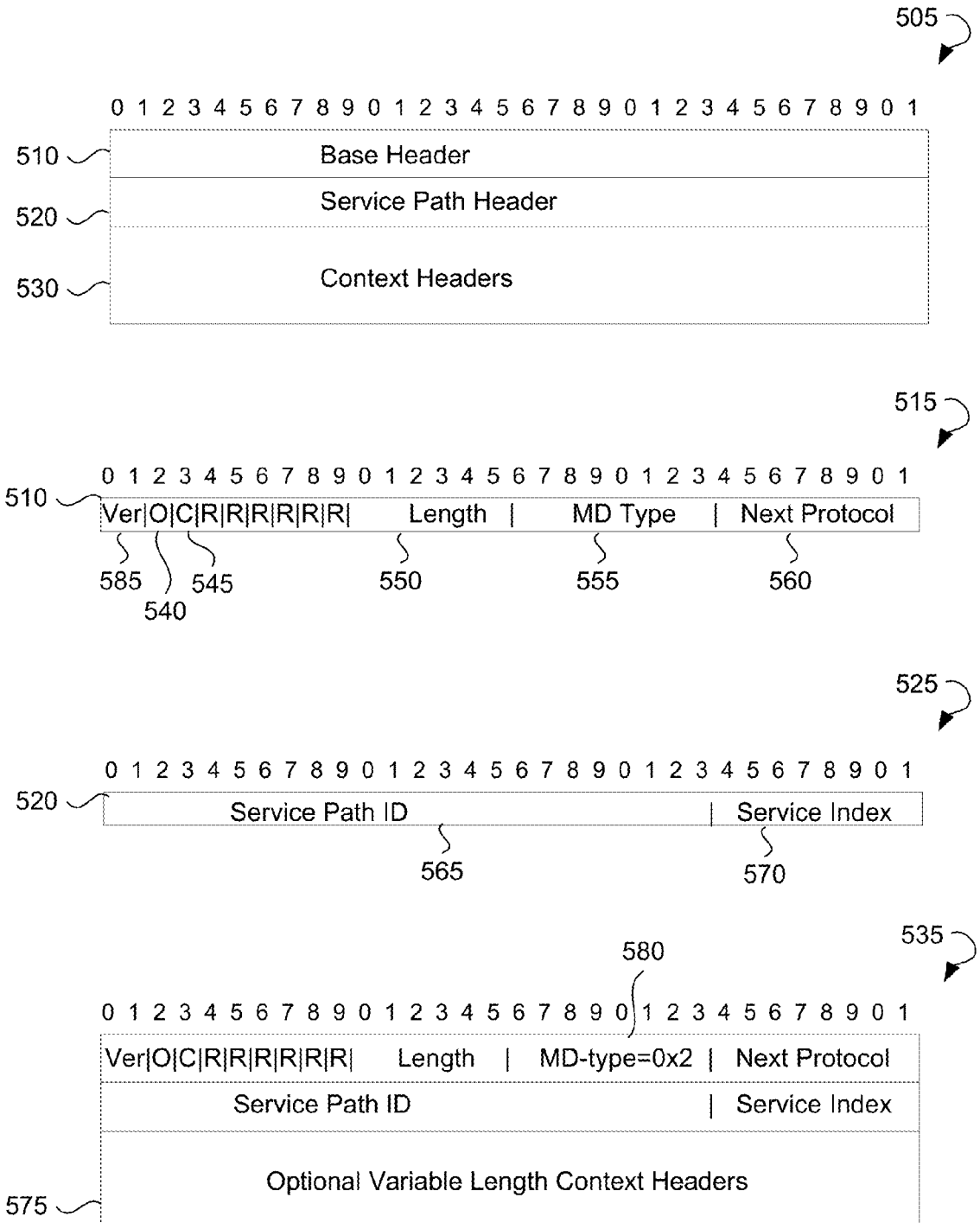
FIG. 5 shows schematic diagrams of a network service header of a data packet and headers of the network service header.

FIG. 5 represents schematic diagrams 505, 515, 525, 535 showing an NSH and headers of the NSH of a data packet. The NSH may be added onto encapsulated data packets to realize subscriber-to-server service paths. The NSH may provide a mechanism for metadata exchange along the instantiated subscriber-to-server service path. As shown on a schematic diagram 505, the NSH may include a base header 510, a service path header 520, and context headers 530.

The base header 510 is shown in detail on a schematic diagram 515. The base header 510 may be a 4-byte base header used to provide information about the NSH, as well as about the encapsulated data packet. More specifically, the base header 510 may contain the following fields:

Version number 585 that provides data plane versioning, for example "Ver=0x0";

Flags bits that are used to define changes of the base header 510 or parsing behavior within a network version. Two flags may be defined, such as O-bit flag 540 and C-bit flag 545. When the O-bit flag 540 is set, e.g., "O bit=0x0," the data packet may be an operation, administration, and management (OAM) packet. The C-bit flag 545, e.g., "C bit=0x0," may indicate the presence of important metadata encoded as a type-length-value (TLV) element.

Length 550 is a total length of the NSH, including optional variable TLV elements, in 4 byte words. The length may be equal to or greater than 6.

MD Type 555, e.g., "MD Type=0x2." The NSH may define two MD types: "0x1," which may indicate that format of the header includes fixed length context headers, and "0x2," which may not mandate any headers beyond the base header and service path header, and may contain optional variable length context information.

Next Protocol 560, e.g. "Next Protocol=0x1 (IPv4)," may indicate the protocol type of the original data packet.

The service path header 520 is shown in detail on a schematic diagram 525. The service path header 520 may be a 4-byte service path header that follows the base header 510 and defines two fields used to construct a service path: service path identifier 565 and service index 570. The service path identifier 565 may be used to identify the service path that interconnects the needed service functions. The service index 570 may identify the location of the data packet within a service path.

The context headers are shown in detail on a schematic diagram 535 as optional variable length context headers 575. Choosing of MD type 580 as "MD-type=0x2" allows for full flexibility for headers beyond the base header and service path header.

The optional variable length context headers 575 may binary, compressed, and encrypted. The optional variable length context headers 575 may include a parseable string with following example comma-separated parameters:

"Subscriber-ID=00:01:02:03:04:05"<subscriber MAC>;
"AP-ID=10:11:12:13:14:15"<access point MAC>;
"SSID=Comcast-Xfinity-WiFi"<WiFi network identification>;
"Subscriber-Private-IP=192.168.1.100";
"Subscriber-Public-IP=171.100.10.100";
"Destination-Domain=google.com";
"SSL-Common-Name=secure.google.com", and so forth.

The information contained in the NSH may be provided to the analyzing unit using reporting protocols. The reporting protocols may include Netflow, IPFIX, Syslog, and IDPR. The Netflow and IPFIX protocols may include binary records with predefined informational elements. The Syslog protocol may include American standard code for information interchange records with comma-separated (or other delimiter) parameters. The IDPR protocol may include binary records according to an IDPR protocol specification.

Figure 6:
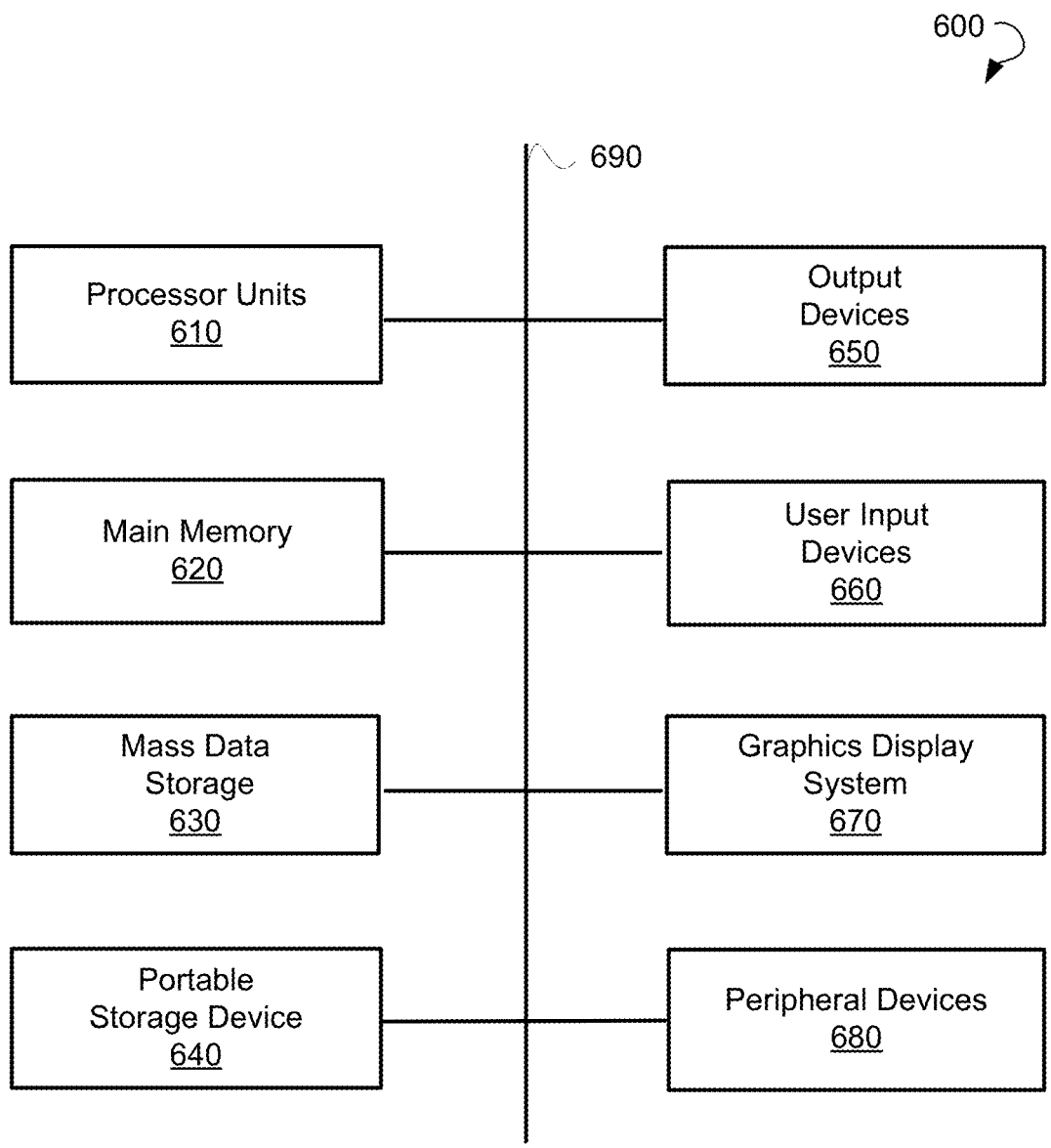
FIG. 6 shows a diagrammatic representation of a computing device for a machine, within which a set of instructions for causing the machine to perform any one or more of the methodologies discussed herein, can be executed.

FIG. 6 illustrates a computer system 600 that may be used to implement embodiments of the present disclosure. The system 600 of FIG. 6 can be implemented in the contexts of the likes of computing systems, networks, servers, or combinations thereof. The computing system 600 of FIG. 6 includes one or more processor units 610 and main memory 620. Main memory 620 stores, in part, instructions and data for execution by processor units 610. Main memory 620 stores the executable code when in operation. The computer system 600 of FIG. 6 further includes a mass data storage 630, portable storage device 640, output devices 650, user input devices 660, a graphics display system 670, and peripheral devices 680. The methods may be implemented in software that is cloud-based.

The components shown in FIG. 6 are depicted as being connected via a single bus 690. The components may be connected through one or more data transport means. Processor units 610 and main memory 620 is connected via a local microprocessor bus, and the mass data storage 630, peripheral devices 680, portable storage device 640, and graphics display system 670 are connected via one or more input/output buses.

Mass data storage 630, which can be implemented with a magnetic disk drive, solid state drive, or an optical disk drive, is a non-volatile storage device for storing data and instructions for use by processor units 610. Mass data storage 630 stores the system software for implementing embodiments of the present disclosure for purposes of loading that software into main memory 620.

Portable storage device 640 operates in conjunction with a portable non-volatile storage medium, such as a floppy disk, compact disk, digital video disc, or a USB storage device, to input and output data and code to and from the computer system 600 of FIG. 6. The system software for implementing embodiments of the present disclosure is stored on such a portable medium and input to the computer system 600 via the portable storage device 640.

User input devices 660 provide a portion of a user interface. User input devices 660 include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices include speakers, printers, network interfaces, and monitors.

Graphics display system 670 includes a liquid crystal display or other suitable display device. Graphics display system 670 receives textual and graphical information and processes the information for output to the display device.

Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer, hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, digital video disk, BLU-RAY DISC, any other optical storage medium, Random-Access Memory, Programmable Read-Only Memory, Erasable Programmable Read-Only Memory, Electronically Erasable Programmable Read Only Memory, flash memory, and/or any other memory chip, module, or cartridge.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for processing a secure data flow are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for processing a secure data flow, the system comprising:
    a servicing node comprising at least one processor, wherein the servicing node is operable to:
        receive a data packet;
        determine that the data packet is associated with the secure data flow;
        obtain subscriber data associated with the data packet; and
        relay the unsecure data to a network controller for behavioral analysis; and
    an analyzing unit comprising at least one processor, wherein the analyzing unit is operable to:
        analyze the data packet, wherein the analyzing of the data packet includes analyzing unsecure data associated with the data packet;
        based on the analysis, classify the secure data flow; and
        process the secure data flow based on the subscriber data and based on the classification of the secure data flow.

2. The system of claim 1, wherein obtaining of the subscriber data includes:
    obtaining host data associated with the data packet; and
    matching the host data to a subscriber in a database.

3. The system of claim 2, wherein the host data includes at least one of the following: a session start indication, a session end indication, a host Internet Protocol (IP) address, and a subscriber identifier (ID).

4. The system of claim 1, wherein the determining that the data packet is associated with the secure data flow includes determining that a payload associated with the data packet is encrypted.

5. The system of claim 1, wherein the unsecure data includes at least one of the following: a Media Access Control (MAC) address, a source network (IP/port) address prior to network address translation (NAT), a source network (IP/port) address after the NAT, a destination network address (DNA), a data packet size, a flow direction, a data packet sequence, an interpacket gap, a certificate, a security key, and a secure sockets layer (SSL) certificate common name.

6. The system of claim 1, wherein the subscriber data is acquired during a subscriber discovery process.

7. A method for processing a secure data flow, the method comprising:
    receiving, by a servicing node, a data packet;
    determining that the data packet is associated with the secure data flow;
    analyzing the data packet;
    based on the analyzing, classifying the secure data flow;
    obtaining subscriber data associated with the data packet; and
    processing the secure data flow based on the subscriber data and based on the classification of the secure data flow, wherein the processing of the secure data flow includes one or more of the following: providing a security policy associated with the secure data flow to a further servicing node and providing a relay policy associated with the secure data flow to the further servicing node.

8. The method of claim 7, wherein obtaining of the subscriber data includes:
    obtaining host data associated with the data packet; and
    matching the host data to a subscriber in a database.

9. The method of claim 8, wherein the host data includes at least one of the following: a session start indication, a session end indication, a host IP address, and a subscriber ID.

10. The method of claim 7, wherein the determining that the data packet is associated with the secure data flow includes determining that a payload associated with the data packet is encrypted.

11. The method of claim 7, wherein analyzing of the data packet includes analyzing of unsecure data associated with the data packet.

12. The method of claim 11, further comprising relaying the unsecure data to a network controller for behavioral analysis.

13. The method of claim 11, wherein the unsecure data includes at least one of the following: a MAC address, a source network (IP/port) address prior to NAT, a source network (IP/port) address after the NAT, a DNA, a data packet size, a flow direction, a data packet sequence, an interpacket gap, a certificate, a security key, and an SSL certificate common name.

14. The method of claim 7, wherein classifying the secure data flow associated with the data packet is further based on third-party data.

15. The method of claim 7, wherein the subscriber data is acquired during a subscriber discovery process.

16. The method of claim 7, wherein the analyzing of the data packet is based on Domain Name System data and Dynamic Host Configuration Protocol data.

17. A system for processing a secure data flow, the system comprising:
    a servicing node comprising at least one processor, wherein the servicing node is operable to:
        receive a data packet;
        determine that the data packet is associated with the secure data flow, wherein the determining that the data packet is associated with the secure data flow includes determining that a payload associated with the data packet is encrypted;
        obtain subscriber data associated with the data packet, wherein the obtaining of the subscriber data includes:
            obtaining host data associated with the data packet; and
            matching the host data to a subscriber in a database; and
        relay unsecure data to a network controller for behavioral analysis; and
    an analyzing unit comprising at least one processor, wherein the analyzing unit is operable to:
        analyze the data packet, wherein the analyzing of the data packet includes analyzing of the unsecure data associated with the data packet;
        based on the analyzing, classify the secure data flow; and
        process the secure data flow based on the subscriber data and based on the classifying of the secure data flow.

18. The system of claim 17, wherein the host data includes at least one of the following: a session start indication, a session end indication, a host Internet Protocol (IP) address, and a subscriber identifier (ID).

19. The system of claim 17, wherein the unsecure data includes at least one of the following: a Media Access Control (MAC) address, a source network (IP/port) address prior to network address translation (NAT), a source network (IP/port) address after the NAT, a destination network address (DNA), a data packet size, a flow direction, a data packet sequence, an interpacket gap, a certificate, a security key, and a secure sockets layer (SSL) certificate common name.

20. The system of claim 17, wherein the subscriber data is acquired during a subscriber discovery process.

* * * * *